(12) United States Patent
Yasuda et al.

(10) Patent No.: US 7,568,550 B2
(45) Date of Patent: Aug. 4, 2009

(54) WORM SUPPORT DEVICE AND POWER ASSIST UNIT HAVING THE SAME

(75) Inventors: Hirotaka Yasuda, Osaka (JP); Hirotsugu Kusano, Osaka (JP); Wataru Yamada, Osaka (JP); Yoshiyuki Saito, Osaka (JP); Shuzo Hirakushi, Osaka (JP)

(73) Assignee: Jtekt Corporation, Osaka (JP)

( * ) Notice: Subject to any disclaimer, the term of this patent is extended or adjusted under 35 U.S.C. 154(b) by 92 days.

(21) Appl. No.: 10/537,791

(22) PCT Filed: Dec. 5, 2003

(86) PCT No.: PCT/JP03/15612

§ 371 (c)(1),
(2), (4) Date: Jun. 6, 2005

(87) PCT Pub. No.: WO2004/051101

PCT Pub. Date: Jun. 17, 2004

(65) Prior Publication Data

US 2006/0117883 A1 Jun. 8, 2006

(30) Foreign Application Priority Data

Dec. 5, 2002 (JP) .............................. 2002-353474
Jan. 28, 2003 (JP) .............................. 2003-019355

(51) Int. Cl.
*B62D 5/04* (2006.01)

(52) U.S. Cl. ...................................... 180/444; 384/450
(58) Field of Classification Search ................. 180/444; 74/424.82; 384/450, 516, 513
See application file for complete search history.

(56) References Cited

U.S. PATENT DOCUMENTS

| 4,343,521 | A  | * | 8/1982  | Akabane et al. ............. 384/450 |
| 6,364,049 | B1 | * | 4/2002  | Iwasaki et al. ............... 180/444 |
| 6,550,567 | B2 |   | 4/2003  | Murakami et al. |
| 6,655,846 | B2 | * | 12/2003 | Beckers et al. .............. 384/513 |
| 2002/0039460 | A1 | * | 4/2002 | Nishimura et al. .......... 384/516 |

FOREIGN PATENT DOCUMENTS

| JP | 11-43062    | 2/1999  |
| JP | 2000-74074  | 3/2000  |
| JP | 2000-249149 | 9/2000  |
| JP | 2000-291665 | 10/2000 |
| JP | 2001-248652 | 9/2001  |
| JP | 2002-67992  | 3/2002  |
| JP | 2002-284022 | 10/2002 |

* cited by examiner

*Primary Examiner*—Tony H. Winner
(74) *Attorney, Agent, or Firm*—Jordan & Hamburg LLP

(57) ABSTRACT

Deep groove ball bearings are used as bearings supporting both side portions of a worm. In the first bearing on the side of a motor, the curvature radius of a raceway groove in an inner ring or the curvature radius of a raceway groove in an outer ring are set to a specific numerical range with respect to the diameter of a ball.

4 Claims, 13 Drawing Sheets

WORM SUPPORT DEVICE AND POWER ASSIST UNIT HAVING THE SAME

BACKGROUND OF THE INVENTION

The present invention relates to a worm support device and a power assist unit having the same.

Electric power steering apparatuses for automobiles are equipped with a power assist unit providing a steering assist power to a wheel steering mechanism. The power assist unit comprises a motor and a worm gear mechanism. The worm mechanism includes a worm shaft and a worm wheel. An appropriate backlash is provided in the engagement portion of the worm and worm wheel. Because of the backlash, when the worm is rotated in reverse, the tooth surface of the worm collides with the tooth surface of the worm wheel, producing a knocking sound. In order to overcome this drawback, an elastic body such as a spring or an O ring is inserted between the bearing for supporting the worm and the housing or worm (Japanese Patent Applications Laid-open No. H11-43062 and H11-171027).

In the above-described conventional example, an elastic body such as a spring or an O ring is required and the number of parts and assembling operations is increased. Further, changes in the elastic constant of the elastic body with time also cause a concern.

BRIEF SUMMARY OF THE INVENTION

The worm support device in accordance with the present invention is a worm support device for supporting shaft sections on both end sides of a worm connected to a drive source on a housing via bearings, wherein a deep groove ball bearing satisfying at least either a first condition where the curvature radius of a racetrack groove of an inner ring is between 52.5% or more and 75% or less of the diameter of a ball or a second condition where the curvature radius of a racetrack groove of an outer ring is between 53.5% or more and 85% or less of the diameter of a ball is used for the bearing (first bearing) on the drive source side.

In sum, the first bearing is a deep groove ball bearing and the elastic constant in the axial direction thereof is appropriately decreased. In other words, when a rotary drive force acts upon the shaft section of the worm, the balls of the first bearing roll in the axial direction, while elastically bending and deforming a racetrack groove of the inner ring and/or the racetrack groove of the outer ring. Therefore, the inner ring and outer ring shift in the axial direction and allow for axial displacement of the shaft sections of the worm. Because the axial displacement of the shaft sections of the worm is thus allowed by using the elasticity of the inner ring or outer ring, the shaft sections of the worm move gradually in a state with the prescribed tension and are prevented from moving rapidly. As a result, for example, when the worm wheel is engaged with the gear section of the worm, the knocking sound produced when the tooth surface of the gear section is collided with the tooth surface of the worm wheel is reduced or prevented.

The inner ring of the first bearing is tightly fit with respect to the shaft section of the worm, and the bearing (second bearing) supporting the side of the haft section opposite to the drive source can be so joined that it can move with respect to the shaft section of the worm or the housing. The second bearing may have the same configuration as the first bearing and may be a rolling bearing such as a needle rolling bearing or a sliding bearing such as a bushing.

In this case, as described hereinabove, the worm shaft can move smoothly when it is displaced in the axial direction.

Further, the first bearing can be set to a negative gap. In this case, as described above, when the balls of the first bearing and the inner and outer rings move in the axial direction, the play thereof is prevented.

A power assist unit in accordance with the present invention comprises a motor and a worm gear mechanism for reducing the rotational motion generated by the motor and outputting it as the steering assist power, wherein the worm gear mechanism comprises a worm coupled to the output shaft of the motor and a worm wheel engaged with the gear section of the worm and externally fixed to the rotary shaft, a first bearing on the motor side and a second bearing on the side opposite the motor side for supporting the respective shaft sections on both end sides of the worm on the housing, and the housing for accommodating at least the worm and both bearings in a supported state thereof, and a deep-groove ball bearing satisfying at least either a first condition where the curvature radius of a racetrack groove of an inner ring is between 52.5% or more and 75% or less of the diameter of a ball or a second condition where the curvature radius of a racetrack groove of an outer ring is between 53.5% or more and 85% or less of the diameter of a ball is used for the first bearing.

The configuration of this power assist unit is similar to that of the above-described worm support device. Therefore, the knocking sound produced when the tooth surface of the gear section is collided with the tooth surface of the worm wheel is reduced or prevented.

Moreover, in the case of the conventional power assist unit, the rotary drive force acts upon the worm from the worm wheel within the interval from the steering of the steering wheel to the action of the steering assist power from the motor upon the worm (called the initial stage of steering). Because the motor has a large inertial weight, however, the steering feeling of the driver is unfavorable, for example, the steering cannot be conducted since the steering feel is heavy.

With this respect, too, with the above-described configuration in accordance with the present invention, if the bearing for worm support is a deep groove ball bearing and the elastic constant in the axial direction thereof is set appropriately low, then when a rotary drive force acts from the worm wheel upon the worm in the initial stage of steering, the worm is gradually displaced in a state with the prescribed tension in the axial direction before the worm is rotated due to elastic properties of the bearing. Therefore, no feeling of discomfort is induced.

BRIEF DESCRIPTION OF THE DRAWINGS

Accompanying the specification are figures which assist in illustrating the embodiments of the invention, in which.

DETAILED DESCRIPTION OF THE INVENTION

Figure 1:
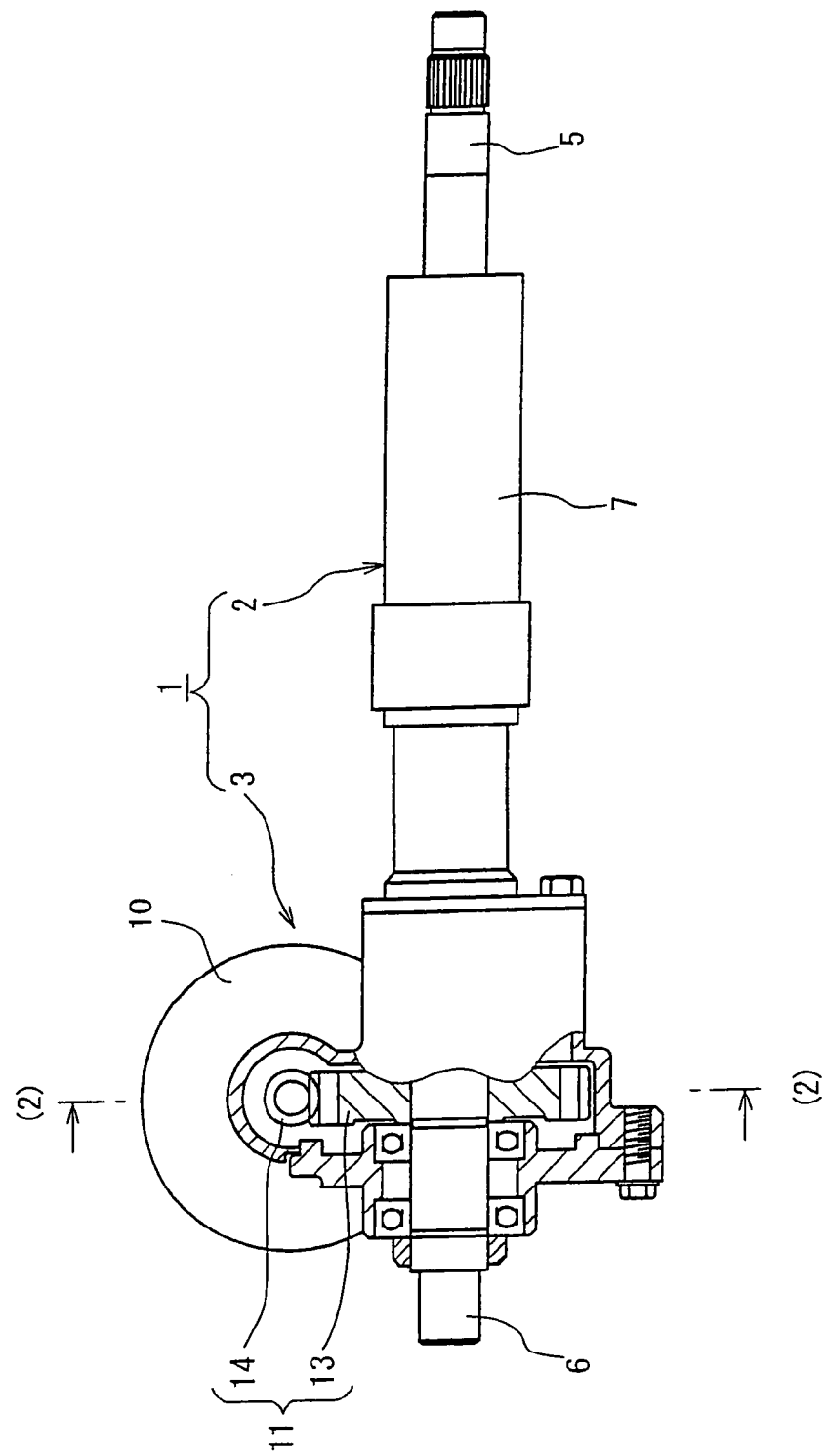
FIG. 1 is a side view illustrating an electric power steering device of the preferred mode for carrying out the invention.
Figure 2:
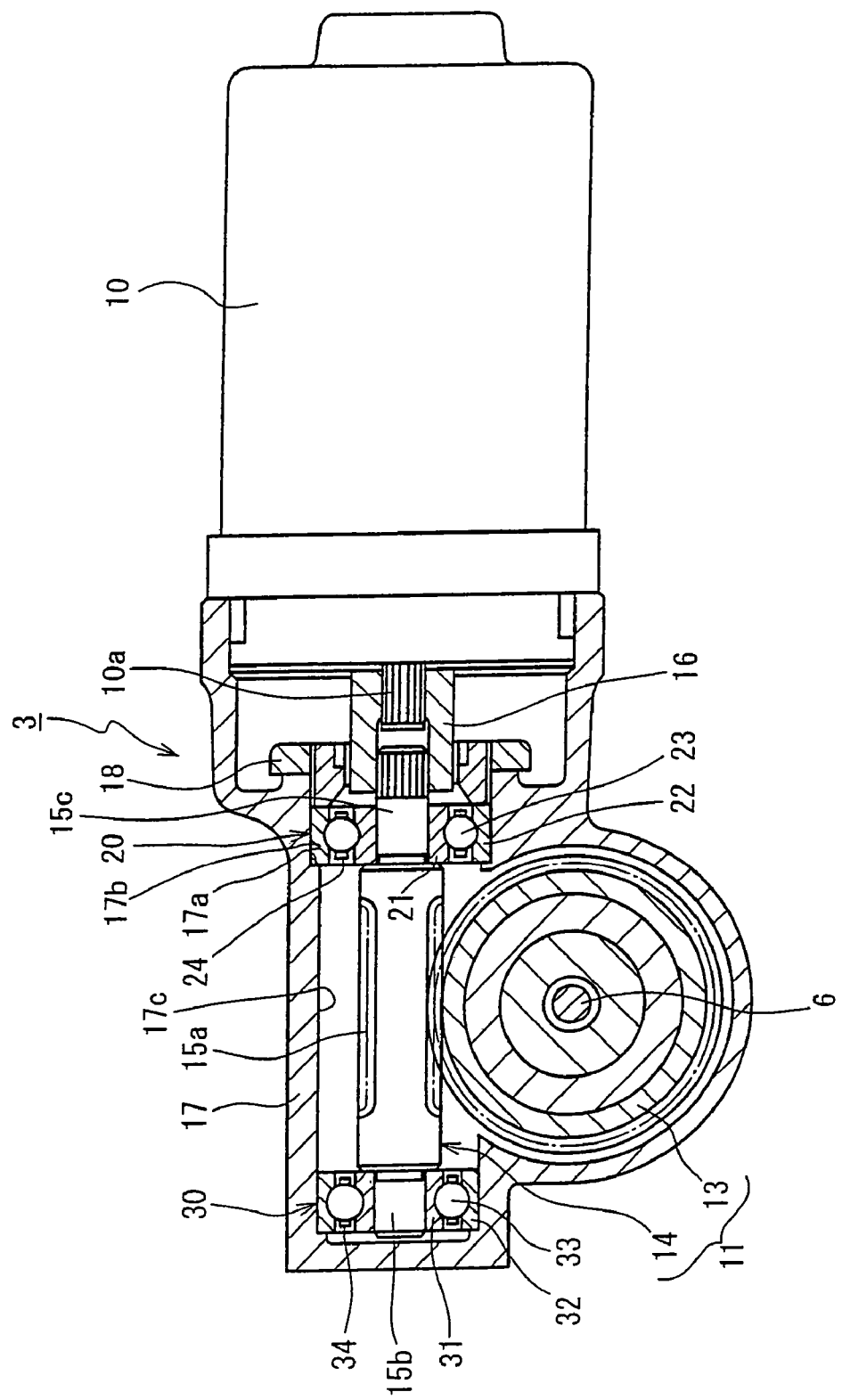
FIG. 2 is an enlarged partial cross-sectional view of the power assist unit, as viewed from the section along the (2)-(2) line in FIG. 1.
Figure 3:
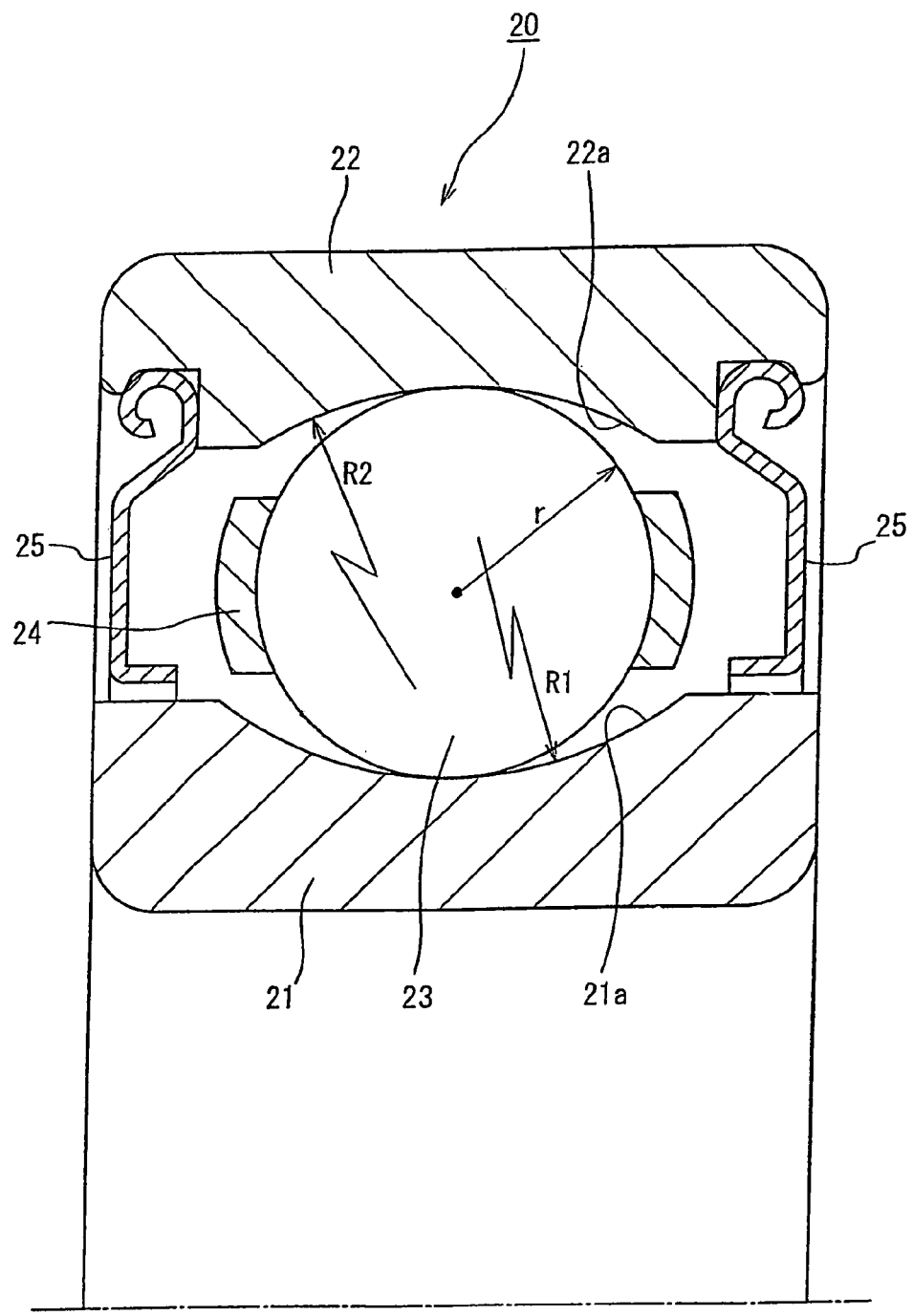
FIG. 3 is a cross-sectional view showing an enlarged upper half of the first bearing shown in FIG. 2.

One preferred embodiment for carrying out the invention is illustrated by FIGS. 1 to 3. The electric power steering apparatus 1 of the example shown in the figures comprises a steering shaft 2 and a power assist unit 3.

The steering shaft 2 transmits a steering force to a wheel steering mechanism (not shown) in response to the rotation control of the steering wheel (not shown) and comprises an input shaft 5 having the steering wheel mounted thereon and an output shaft 6 linked to the wheel steering mechanism, the two shafts being joined with a torsion bar (not shown).

The power assist unit 3 applies a rotational motion to the steering shaft 2 when a steering force (rotary drive force) was inputted to the steering shaft 2 following the rotary control of the steering wheel and comprises a motor 10 and a worm gear mechanism 11.

The motor 10 outputs a rotary power in response to a command from a control unit (not shown). The worm gear mechanism 11 reduces the steering assisting force outputted from the motor 10 and outputs the steering assisting force relating to the steering shaft 2. The worm gear mechanism 11 comprises a worm wheel 13 and a worm 14.

The worm wheel 13 is externally fixed to the steering shaft 2 on the side of the output shaft 6. The worm 14 has a worm gear section 15a (FIG. 2) formed in the intermediate portion thereof in the axial direction, and this worm gear section 15a is engaged with the worm wheel 13. The worm 14 is coupled to the output shaft 10a of the motor 10 via a coupling 16. Respective spline teeth are formed on the outer periphery of the worm 14 on the side of the motor 10, inner periphery of the coupling 16, and outer periphery of the output shaft 10a of the motor 10. Those three groups are spline mated, thereby providing for integration in the rotation direction, while being free to move with respect to each other in the axial direction. In the worm 14, worm shaft sections 15b, 15c on both ends of the worm gear section 15a formed in the intermediate portion of the worm in the axial direction are rotatably supported by respective bearings 20, 30 with respect to the housing 17.

Turning to FIG. 3, the two bearings 20, 30 are deep groove ball bearings. Among them, the first bearing 20 on the side of the motor 10 comprises an inner ring 21, an outer ring 22, a plurality of balls 23, and a retainer 24. The inner space of the first bearing 20 is sealed with a seal 25, and a lubricant such as grease is introduced into the inner space of the bearing. The seal 25 is of a contactless type called a sealed plate, the outer peripheral portion thereof is mounted on both ends of the outer ring 22 in the axial direction, and the inner peripheral portion produces a contactless sealing portion facing the inner ring 21 via a tiny gap.

Similarly to the first bearing 20, the second bearing 30 disposed on the end side in the worm 14 comprises an inner ring 31, an outer ring 32, a plurality of balls 33, and a retainer 34 (this configuration is not shown in detail). The outer diameter size of the first bearing 20 is set larger than that of the second bearing 30. A seal for sealing the inside of the bearings may be used, but the use thereof is optional.

The configuration of the first and second bearings 20, 30 and the mode of attaching the first and second bearings 20, 30 to the worm 14 will be described below.

In the first bearing 20 disposed on the side of the motor 10, as shown in FIG. 3, the curvature radius R1 of the racetrack groove 21a of the inner ring 21 is set at from 52.5% or more to 75% or less, preferably from 52.5% or more to 70% or less, even more preferably from 52.5% or more to 65% or less of the radius r of the balls 23.

The curvature radius R2 of the racetrack groove 22a of the outer ring 22 is set at from 53.5% or more to 85% or less, preferably from 53.5% or more to 80% or less, even more preferably from 53.5% or more to 75% or less of the radius r of the balls 23. In the first bearing 20, a negative gap is set, that is, the radial inner gap is set as a negative value.

The "%" above represents the curvatures M1, M2 of the racetrack grooves 21a, 22a, respectively, which are given by (r/R1)×100% and (r/R2)×100%. In the present embodiment the curvature M1 is set to 60% and the curvature M2 is set to 70%. As the upper limit of the ranges of the curvatures M1, M2 decreases, the elastic constant of the bearings 20, 22 decreases and a larger axial displacement of the worm 14 is allowed. Therefore, in order to guarantee the margin of the axial displacement of the worm 14, the maximum upper limit for the range of the curvatures M1, M2 is set at 75% for the curvature M1 and 85% for the curvature M2, and various settings below those upper limits are possible.

On the other hand, if the lower limit of the ranges of the curvatures M1, M2 is too low, the above-mentioned elastic constant becomes too small and the axial displacement of the worm 14 becomes too larger. For this reason, the lower limits of the curvatures M1, M2 are set to the above-described constant values, that is, 52.5% for the curvature M1 and 53.5% for the curvature M2.

In the second bearing 30, the curvature radius R3 of the racetrack groove 31a of the inner ring 31 is set at from 51.5% or more to 52.5% or less, preferably from 51.5% or more to 52% or less, of the radius r of the balls 33. Further, the curvature radius R4 of the racetrack groove 32a of the outer ring 32 is set at from 52.5% or more to 53% or less of the radius r of the balls 33. In the second bearing 30, a negative gap is set, that is, the radial inner gap is set as a negative value. The "%" above represents the curvatures M3, M4 of the racetrack grooves 31a, 32a, respectively, which are given by (r/R3)×100% and (r/R4)×100%.

In the first and second bearings 20, 30, the hardness of the balls 23, 33 is set higher than the hardness of the inner rings 21, 31 and outer rings 22, 32, similarly to the generally used products.

The joining state of the inner ring 21 (FIG. 2) of the first bearing 20 and the worm shaft section 15b on one end side of the worm gear section 15a in the worm 14 is set to "tight fitting". On the other hand, the joining state of the inner ring 31 of the second bearing 30 disposed on the opposite side of the motor 10 and the worm shaft section 15c on the other end side of the worm gear section 15a of the worm 14 is set to "loose fitting".

The outer ring 22 of the first bearing 20 is "loose fitted" with respect to a large-diameter inner peripheral surface 17b of the inner peripheral surfaces of the housing 17 and positioned in the axial direction by sandwiching from the axial direction between a step wall surface 17a obtained due to the step between a small-diameter inner peripheral surface 17c and the large-diameter inner peripheral surface 17b of the housing 17 and a threaded lid which is mounted by threading on the large-diameter inner peripheral surface 17b of the housing 17. On the other hand, the outer ring 32 of the second bearing 30 is joined by press fitting into the small-diameter inner peripheral surface 17c of the housing 17 and positioned in the axial direction.

If the curvature radii R1, R2 of the first bearing 20 are thus set as high as possible, the elastic constant of the first bearing 20 in the radial direction decreases appropriately. In other words, when the inner ring 21 that is externally fit on the worm 14 and the external ring 22 that is internally fit in the housing 17 are impelled toward each other in the axial direction by the application of an axial load to the worm 14, the balls 23 of the first bearing 20 roll in the axial direction, while causing elastic bending of the racetrack groove 21a of the inner ring 21 and the racetrack groove 22a of the outer ring 22. Therefore, the inner ring 21 and outer ring 22 are shifted in the axial direction allowing for axial displacement of the worm 14. As described above, because the inner ring 31 of the second bearing 30 is loosely fit with respect to the worm 14, a smooth movement is executed when the worm 14 is displaced, as described above, in the axial direction.

Moreover, because a pressure is applied upon setting the first bearing 20 to a negative gap, no play occurs when the balls 23 and inner and outer rings 21, 22 move with respect to each other in the axial direction, as described hereinabove.

Thus, because the axial displacement of the worm 14 is allowed by using the elasticity of the inner ring and outer ring 21, 22, the worm 14 moves gradually in a state with the prescribed tension and is prevented from moving rapidly.

More specifically, within the interval from steering the steering wheel to the action of the steering assist power from the motor 10 upon the worm 14 (called the initial stage of steering) or during the reverse steering of the steering wheel, the worm 14 is gradually displaced in the axial direction in a state with the prescribed tension by the elasticity of the first bearing 20 and the worm 14 is prevented from displacing rapidly. As a result, the steering feel within the interval prior to the steering assist power application from the motor 10 can be improved, for example, no feeling of discomfort is induced. Further, during reverse steering of the steering wheel, the knocking sound produced when the tooth surface of the worm gear section 15a of the worm 14 collides with the tooth surface of the worm wheel 13 is reduced or prevented. The inner ring 31 of the second bearing 30 may be fit tightly and the outer ring 32 may be set to a loose fitting.

In the above-described configuration, because no extra parts such as springs were used, the number of parts can be decreased and changes in the elastic constant caused by deterioration with time can be avoided.

Figure 4:
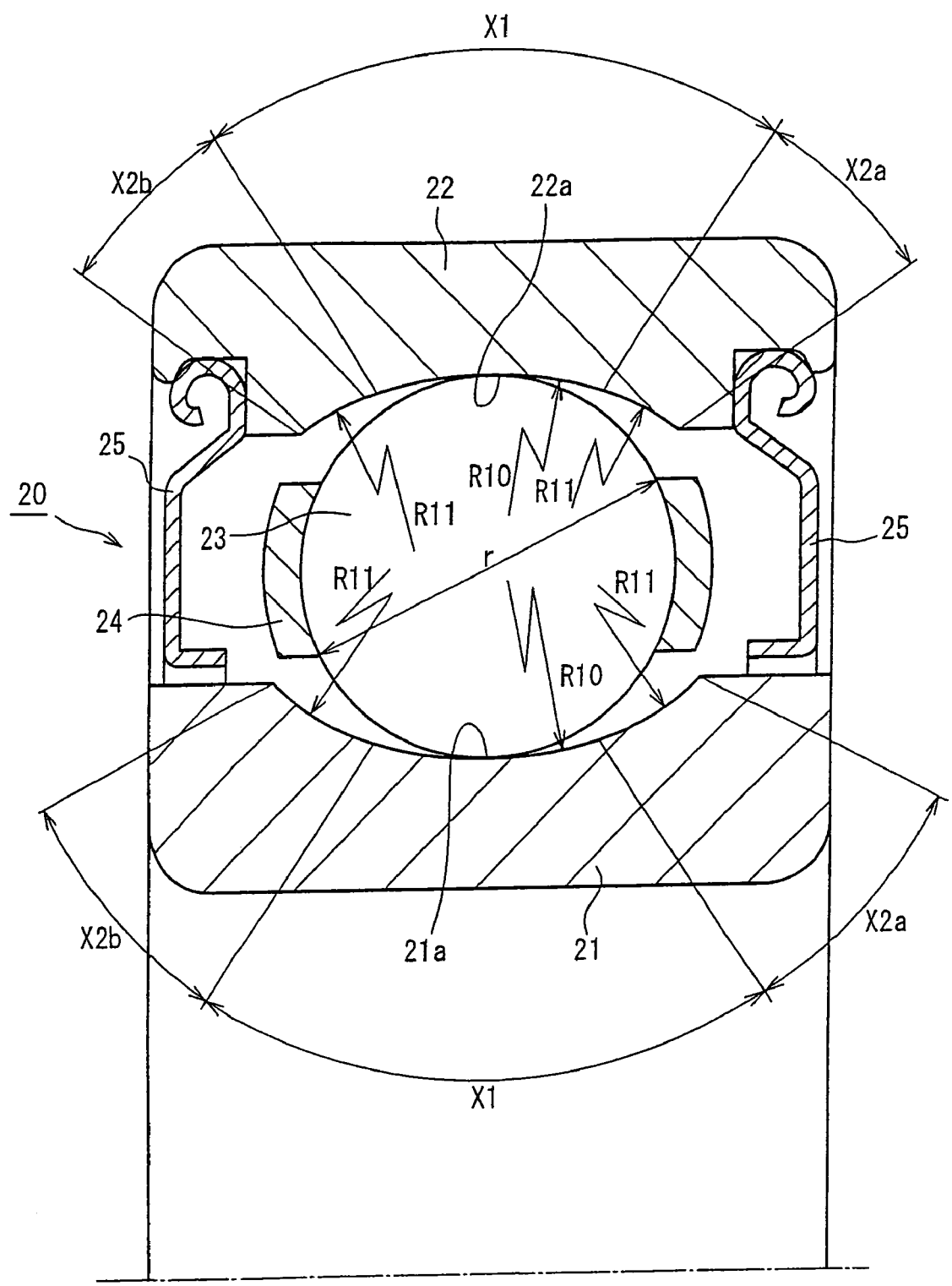
FIG. 4 is a cross-sectional view illustrating another example of the first bearing shown in FIG. 3.
Figure 5:
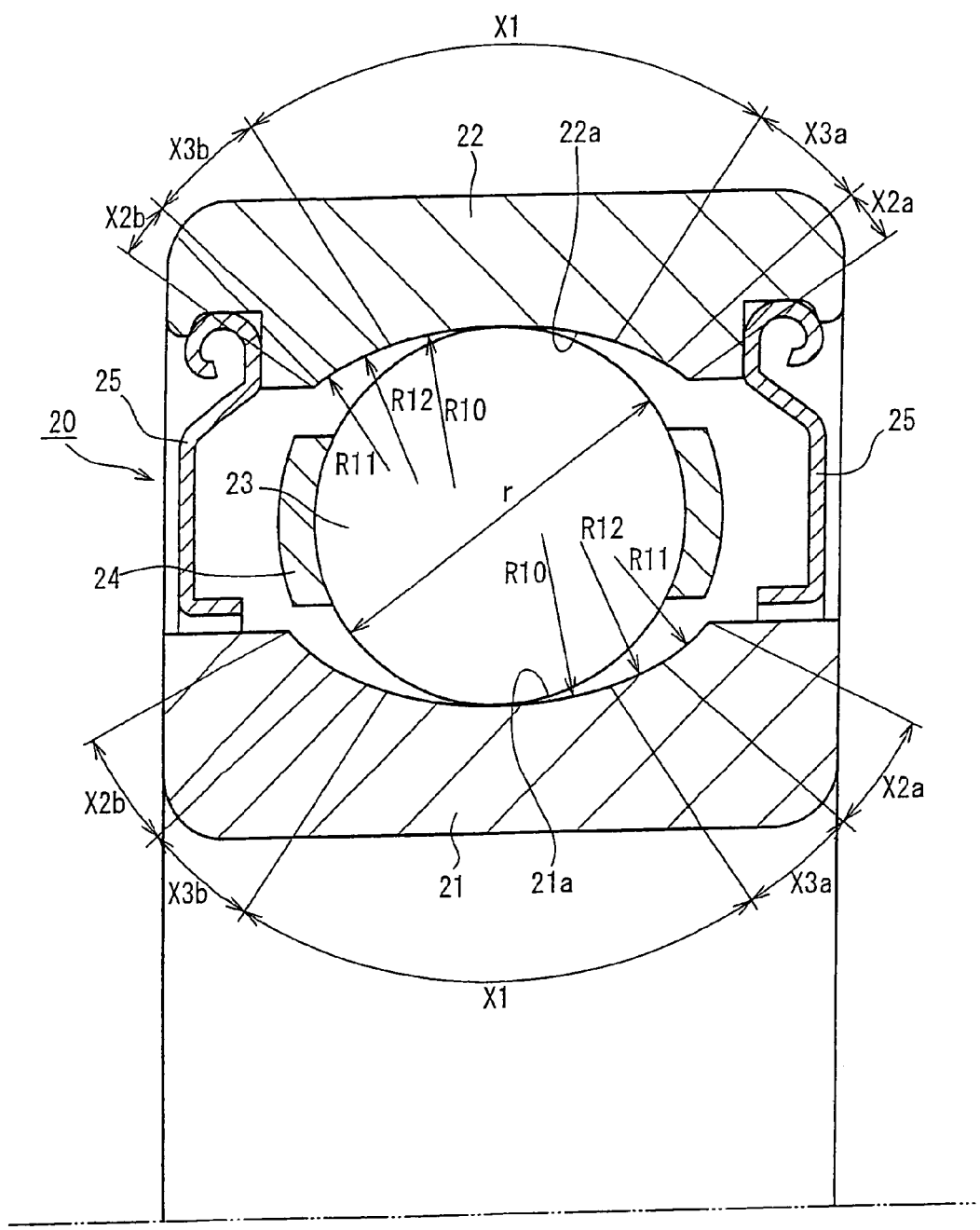
FIG. 5 is a cross-sectional view illustrating yet another example of the first bearing shown in FIG. 3.

The racetrack grooves 21a, 22a in the inner and outer rings 21, 22 of the first bearing 20 can be the composite curved surfaces, as shown in FIGS. 4 and 5. In FIG. 4, the racetrack grooves 21a, 22a are formed from two curved surfaces. The curvature radius R11 in both shoulder regions X2a, X2b is set smaller than the curvature radius R10 in the groove bottom region X1. In FIG. 5, the racetrack grooves 21a, 22a are formed from three curved surfaces. The relationship R10>R12>R11 is set between the curvature radius R10 in the groove bottom region X1, curvature radius R12 in the intermediate regions X3a, X3b, and curvature radius R11 in the two shoulder regions X2a, X2b. When such composite curved surfaces are produced, the balls 23 are reliably prevented from rolling past the two shoulder regions X2a, X2b when they roll in the axial direction. Therefore, it is possible to specify a range in which the inner and outer rings 21, 22 can displace with respect to each other in the axial direction.

In the above-described embodiment, the curvature radii of the racetrack grooves in the inner and outer rings 31, 32 of the second bearing 30 disposed on the distal end side of the worm 14 can be set similarly to those of the first bearing 20 explained hereinabove in the embodiment. Furthermore, the curvature radius of the racetrack groove in any one of the inner rings 21, 31 and outer rings 22, 32 may be also set within a numerical range set forth by the JIS standard.

The above-described embodiment relates to the electric power steering apparatus of a column assist type having a power assist unit 3 (FIG. 1) disposed on a steering shaft 2. However, an electric power steering apparatus can be also of a pinion assist type where the power assist unit 3 is disposed in a steering gear box. In this case, the worm wheel 11 of the power assist unit 3 is externally mounted on the pinion shaft of the steering gear box.

As described hereinabove, in the worm support apparatus in accordance with the present invention, the axial displacement of the worm is allowed by using the elasticity of the inner ring or outer ring of the first bearing. Therefore, when a rotary drive force acts upon the worm, the worm can move slowly in a state with the prescribed tension and can be prevented from moving rapidly. Therefore, a knocking sound produced when the worm wheel engaged with the gear section of the worm collides therewith can be reduced or prevented.

Further, in the power assist unit in accordance with the present invention, in the same manner as described hereinabove, when the tooth surface of the gear section of the worm collides with the tooth surface of the worm wheel, the knocking sound can be reduced or prevented. Moreover, when a rotary drive force acts from the worm wheel upon the worm in the initial stage of steering of the steering wheel, the worm can be displaced gradually in the axial direction in a state with the prescribed tension, thereby providing for improvements, such as lack of discomfort during steering.

Another mode of the present invention will be described below.

Figure 6:
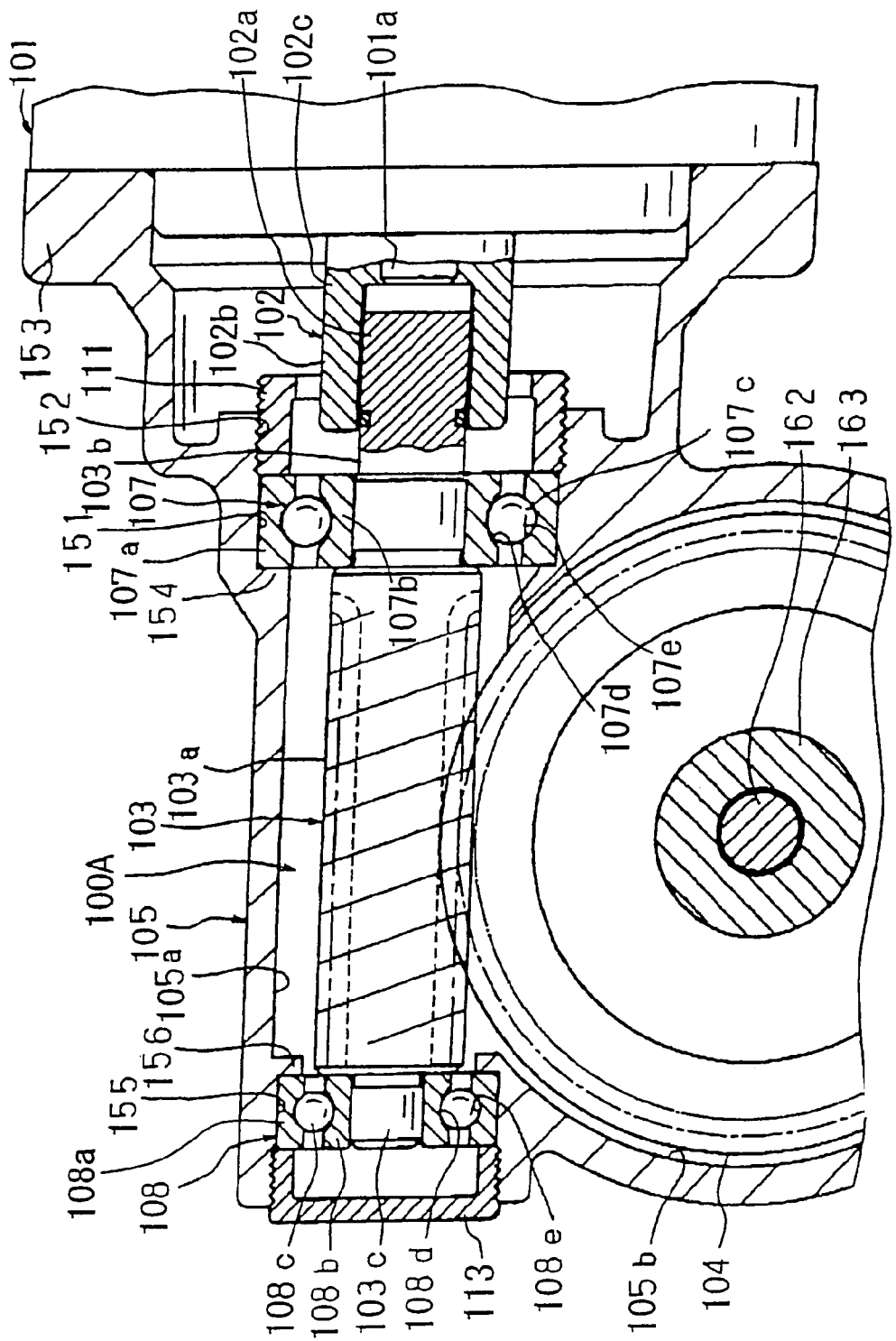
FIG. 6 is an enlarged main cross-sectional view of another power assist unit.
Figure 7:
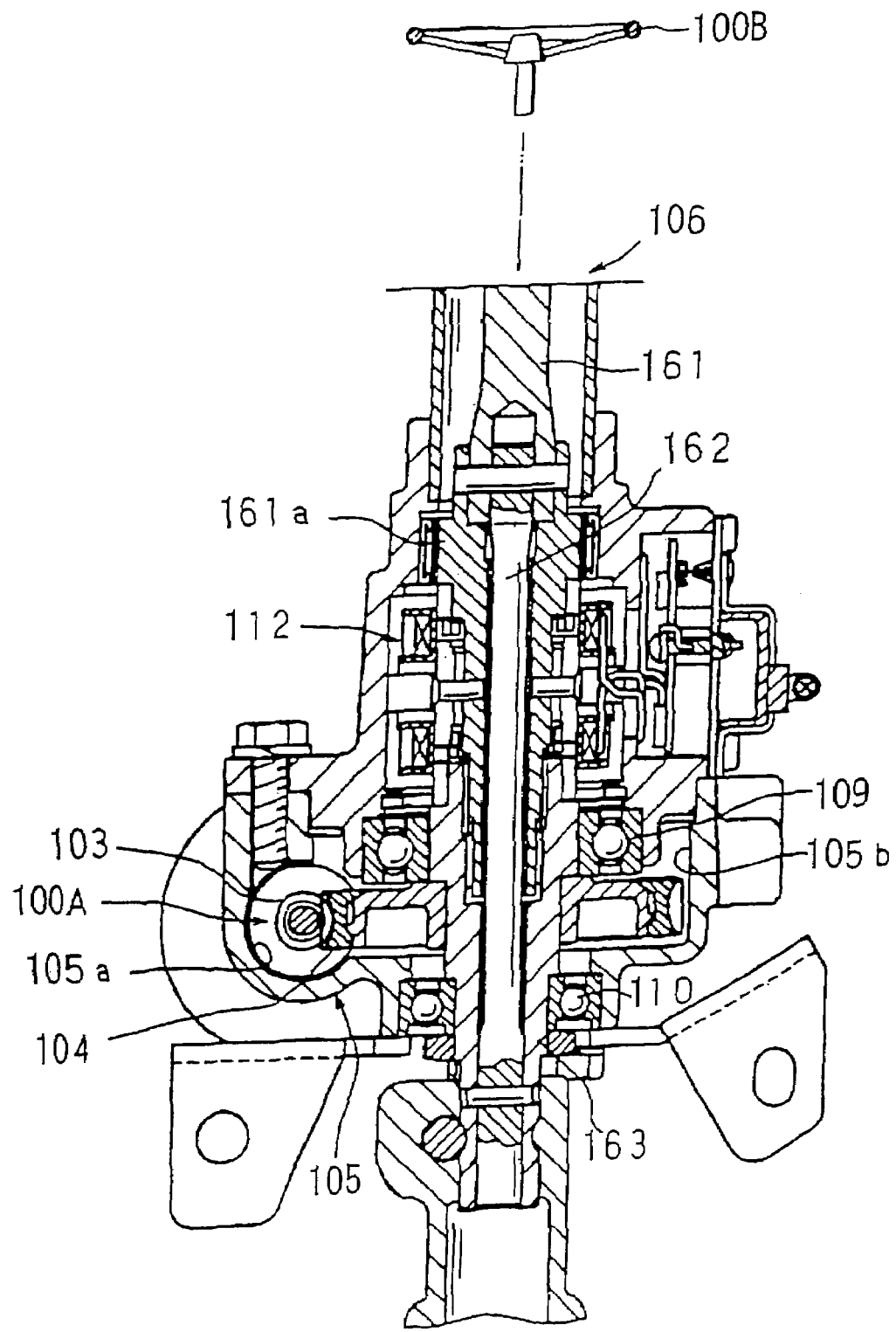
FIG. 7 illustrates the configuration of another electric power steering device.

Referring to the power assist unit shown in FIG. 6 and an electric power steering device (shown in FIG. 7) incorporating the power assist unit shown in FIG. 6, this electric power steering device comprises a motor 101 for steering assist and a worm gear mechanism 100A. The mechanism 100A has a worm 103 as a small gear connected to the drive shaft 101a of the motor 101 via a coupling 102 having a male coupling 102a and a female coupling 102b and a worm wheel 104 as a large gear engaged with the worm 103. The device has a housing 105 serving as a support member for accommodating and supporting the worm gear mechanism 100A, and steering means 106 connected to the worm gear mechanism 100A.

The steering means 106 comprises an input shaft 161 connected by one end thereof to the steering wheel 100B for steering and having a tubular section 161a at the other end, a torsion bar 162 inserted into the tubular section 161a, coupled by one end thereof to the tubular section 161a of the input shaft 161, and twisted by the action of the steering torque applied to the steering wheel 100B, and an output shaft 163 coupled by the other end thereof to the other end section of the torsion bar 162 and connected to the worm gear mechanism 100A, wherein the output shaft 163 is connected to a steering mechanism (not shown), for example, of a rack-and-pinion system, via a universal joint.

The housing 105 has a first accommodation section 105a that accommodates the worm 103 having shaft sections 103b, 103c at both ends of the tooth section 103a and rotatably supports the shaft sections 103b, 103c of the worm 103 via the deep groove bearings 107, 108 and a second accommodation section 105b that accommodates the worm wheel 104 and supports the worm wheel 104 via an output shaft 163 and two deep groove bearings 109, 110 mated with the output shaft 163.

The first accommodation section 105a extends in the axial direction of the worm 103, and a support hole 151 for mating with and supporting the outer ring 107a of the bearing 107, a motor mounting section 153 and a threaded hole 152 connected to one end of the support hole 151, and a control section 154 (e.g., a step in housing structure) connected to the other end of the support hole 151 and serving to control the movement of the bearing 107 are provided in one end section of the first accommodation section in the longitudinal direction thereof.

Further, the outer ring 107a of the bearing 107 is joined to the support hole 151, an annular threaded lid 111 abutting against one end of the outer ring 107a is threaded into the threaded hole 152, and the other end section of the outer ring 107a is pressed against the control section 154. Further, the motor 101 is mounted on the motor mounting section 153.

A support hole 155 for mating with and supporting the outer ring 108a of the bearing 108 and a control section 156 connected to one end of the support hole 155 and serving to control the movement of the outer ring 108a of the bearing 108 are provided in the other end section of the first accommodation section 105a. The other end section of the support hole 155 is opened to the outside, a lid 113 is threaded into the open portion, and the other end of the outer ring 108a is pressed against the control section 156.

In the worm 103 of the worm gear mechanism 100A, the shaft section 103b provided at one end of the tooth section 103a having a plurality of teeth is inserted, so that it is free to move in the axial direction, into the inner ring 107b of the bearing 107 and rotatably supported in the support hole 151 via the bearing 107. The shaft section 103c provided at the other end of the tooth section 103a is inserted, so that it is free to move in the axial direction, into the inner ring 108b of the bearing 108 and rotatably supported in the support hole 155 via the bearing 108. The inner rings 107b, 108b abut against the tow ends of the tooth section 103a. When the worm 103 moves in one axial direction (rightward), the inner ring 107b is pushed in the one axial direction, and when the worm 103 moves in the other axial direction (leftward), the inner ring 108b is pushed in the other axial direction.

The worm wheel 104 is mated with and fixed to the intermediate portion of the output shaft 163.

Figure 8:
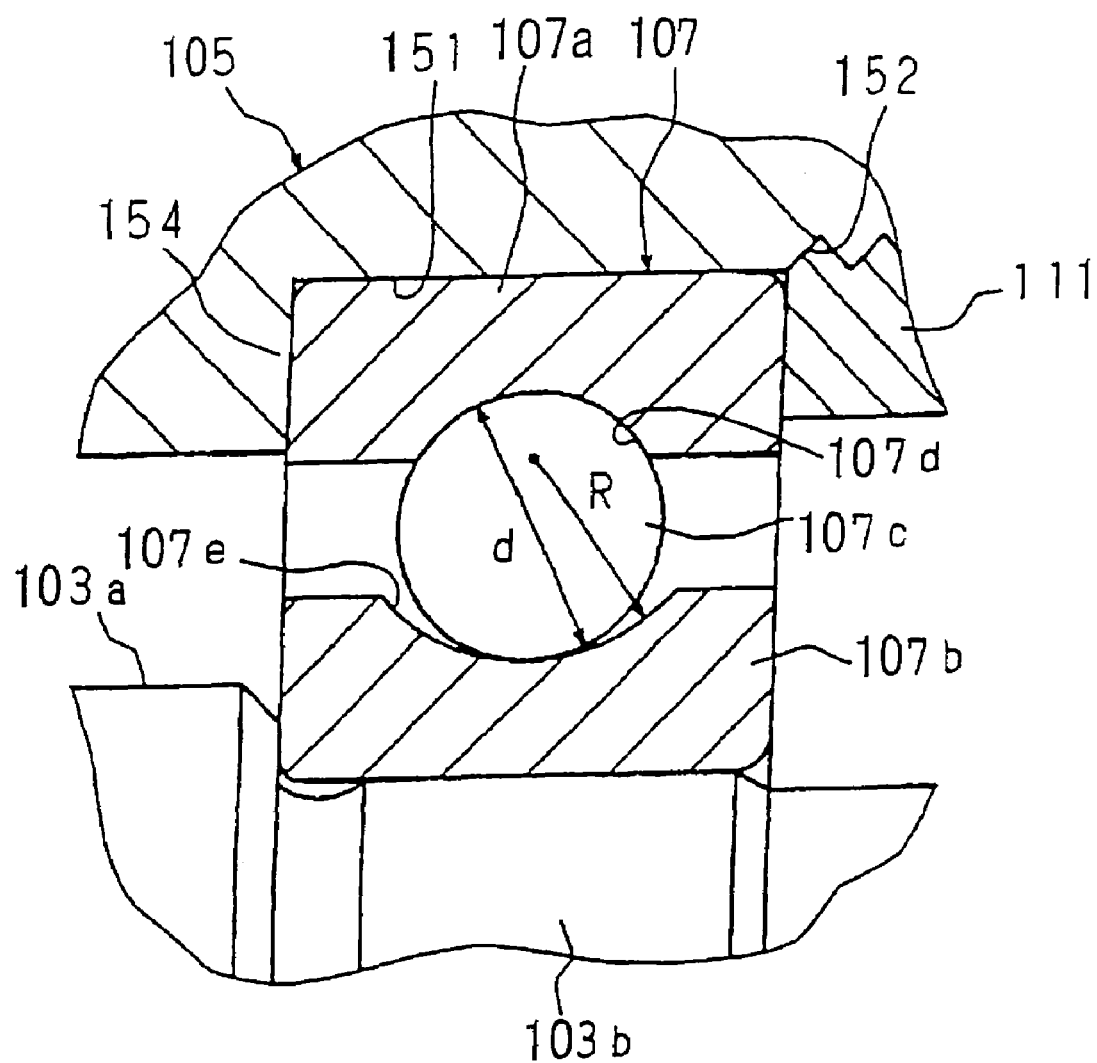
FIG. 8 is a cross-sectional view illustrating an enlarged upper half of another bearing.

FIG. 8 is an enlarged cross-sectional view of part of the bearing.

The value of the axial inner gap of the bearings 107, 108 that support such worm 103 is larger than the standard value specified by the Japanese Industrial Standard. More specifically, if the diameter of balls 107c, 108c is denoted by d, and the radius of racetrack grooves 107d, 108d of the inner rings 107b, 108b is denoted by R, then when the curvature radius d/R of the racetrack grooves 107d, 108d relating to the balls 107c, 108c is set to a value (for example, 60-80%) larger than the value (53%) set forth by the Japanese Industrial Standard, the value of the axial inner gap will be larger than the standard value of the Japanese Industrial Standard and the worm 103 supported by the bearings 107, 108 can be moved in the axial direction with respect to the outer rings 107a, 108a. Further, the radii of the balls 107c, 108c and racetrack grooves 107e, 108e of the outer rings 107a, 108a are the standard values. The relationship between the axial inner gap and radial gap is defined by the JIS.

The output shaft 101a (FIG. 6) of the motor 101 and the shaft section 103b of the worm 103 are so joined that they can move with respect to each other in the axial direction via a male coupling 102a and female coupling 102b having serrations. The male coupling 102a is constituted by providing serrations on the peripheral surface of the shaft section 103, and the female coupling 102b is constituted by providing serrations inside the tubular member 102c mated with and fixed to the drive shaft 101a. The male coupling 102a and female coupling 102b are mated by the serrations.

A torque sensor 112 (FIG. 7) for detecting the steering torque applied to the steering wheel 100B based on the relative rotation displacement quantity of the input shaft 161 and output shaft 163 corresponding to twisting of the torsion bar 162 is contained in the housing 105, and the drive control is also conducted based on the torque detected with the torque sensor 112.

Figure 9:
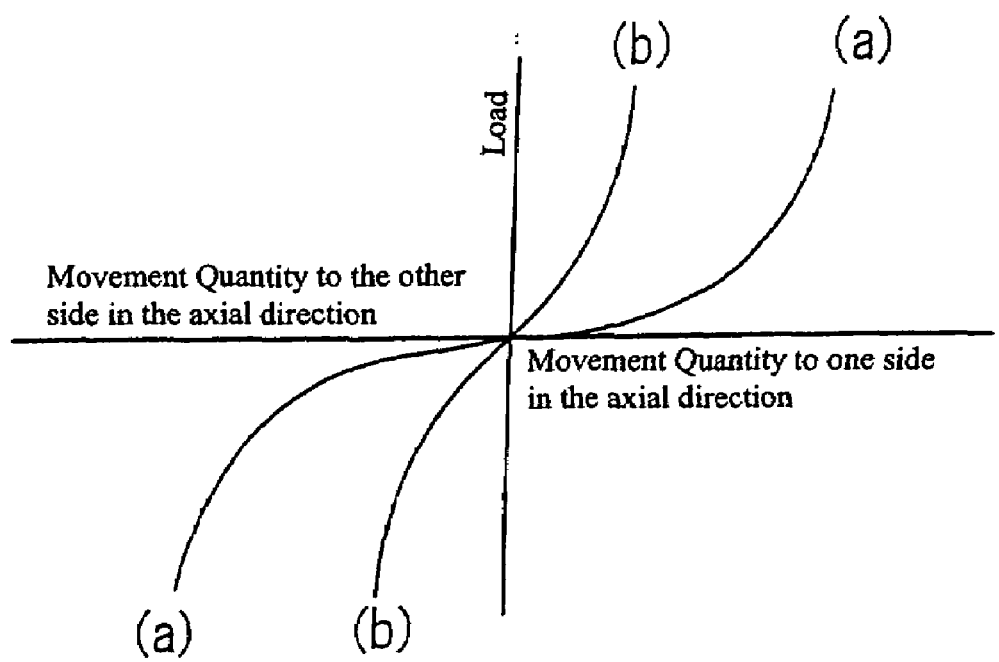
FIG. 9 shows the relationship between the shift of the worm in the axial direction and the load applied to the racetrack grooves.

FIG. 9 illustrates the relationship between the shift of the worm in the axial direction and the load applied to the racetrack grooves 107d, 108d. FIG. 9 shows that when the shift and load are positive, a force in one axial direction (rightward) is applied to the worm 103 and moves it in the one axial direction (rightward), and when the shift and load are negative, a force in the other axial direction (leftward) is applied to the worm 103 and moves it in the other axial direction (leftward).

In the electric power steering apparatus of the above-described configuration, the shaft section 103b (FIG. 6) of the worm 103 in which the shaft section 103b at one end is coupled via the coupling 102 to the drive shaft 101a is rotatably supported by the bearing 107, the shaft section 103c is rotatably supported by the bearing 108, and the worm 103 can be moved in the axial direction with respect to the inner rings 107b, 108b. Further, the balls 107c of the bearings 107, 108 are positioned in the central sections of the racetrack grooves 107d, 108d, 107e, 108e of the outer rings 107a, 108a and inner rings 107b, 108b. The bearings 107, 108 allow the worm 103 to be moved in the axial direction with respect to the outer rings 107a, 108a because the value of the axial inner gap is larger than the JIS-specified value. Furthermore, the shift of the worm 103 in the axial direction can be larger than the shift (d) in the case where the conventional ball bearing with the JIS-specified value of the axial inner gap was used, as shown in FIG. 9.

Thus, when a steering force of the steering wheel 100B (FIG. 7) is transferred to the worm 103 via the input shaft 161, torsion bar 162, output shaft 163, and worm wheel 104 by steering in a steering region without driving from the motor 101, that is, in a steering region where a steering angle during high-speed movement of a vehicle is, for example, as small as about one degree (1°), the following occurs. The worm 103 is moved in one axial direction (rightward) with respect to the outer ring 107a, while pushing the inner ring 107b, or in the other axial direction (leftward) with respect to the outer ring 108a, while pushing the inner ring 108b, by the axial force component applied to the worm 103, the rotation angle of the worm 103 decreases, the transmission of force from the worm 103 to the drive shaft 101a of the motor 101 can be relaxed, the steering load in the steering region without driving from the motor 104 can be reduced, and steering feeling can be improved. Further, when the worm 103 moves in one axial direction (rightward), the shaft section 103c and inner ring 108b move with respect to each other, and when the worm 103 moves in the other axial direction (leftward), the shaft part 103b and inner ring 107b move with respect to each other.

Further, because in this configuration the bearings 107, 108 for supporting the worm 103 were improved, without adding any special mechanism, the structure can be simplified and the worm 103 can be miniaturized, despite the fact that the steering load in a steering region without driving from the motor 101 can be reduced.

Figure 10:
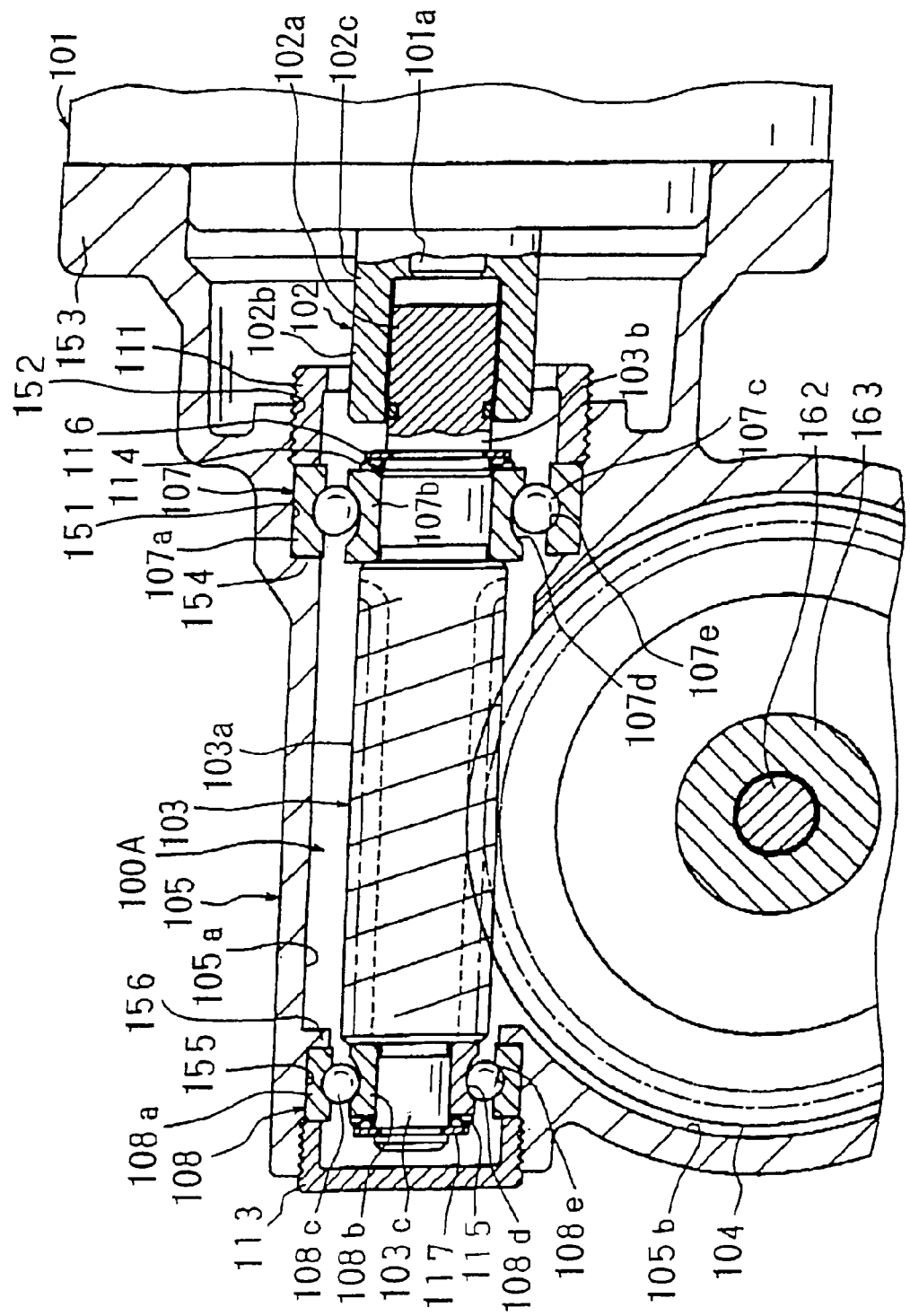
FIG. 10 is an enlarged main cross-sectional view of another power assist unit.

Referring to FIG. 10, the power assist unit shown in this figure comprises elastic rings 114, 115 as suppression means for suppressing the relative movement of the inner ring 107b and outer ring 107a and the inner ring 108b and outer ring 108a of the bearings 107, 108 in the axial direction. The worm 103 can move in the axial direction with respect to the inner rings 107b, 108b.

Referring to FIG. 10, locking rings 116, 117 are provided in the intermediate portions of the shaft sections 103b, 103c, elastic rings 114, 115 such as plate springs, elastic washers, or rubber sheets are provided between locking rings 116, 117 and inner rings 107b, 108b, and the elastic rings 114, 115 displace the inner rings 107b, 108b toward the tooth section 103a with respect to the outer rings 107a, 108a and prevent the inner rings 107b, 108b from floating in the axial direction with respect to the outer rings 107a, 108a.

When the worm 103 moves axially in one direction (rightward) in the steering region without driving from the motor 101, the tooth section 103a of the worm 103 applies pressure to the inner ring 107b, and the worm 103 moves rightward together with the inner ring 107b, while bending the elastic ring 114, and inhibits the relative movement of the inner ring 107b and outer ring 107a in the axial direction. The movement quantity of the worm 103 decreases as the bending quantity of the elastic ring 114 increases. Furthermore, when the worm 103 moves axially in the other direction (leftward), the tooth section 103a of the worm 103 applies pressure to the inner ring 108b and the worm 103 moves leftward together with the inner ring 108b, while bending the elastic ring 115, and inhibits the relative movement of the inner ring 108b and outer ring 108a in the axial direction. The movement quantity of the worm 103 decreases as the bending quantity of the elastic ring 115 increases. Further, when the worm 103 moves axially in one direction (rightward), the elastic ring 115 is bent via the locking ring 117, but the inner ring 108b does not move. When the worm 103 moves axially in the other direction (leftward), the elastic ring 114 is bent via the locking ring 116, but the inner ring 107b does not move.

Further, because the relative movement of the inner rings 107b, 108b and outer rings 107a, 108a in the axial direction is inhibited, when the worm 103 and bearings 107,108 are assembled, the position of the inner rings 107b, 108b in the axial direction relative to the outer rings 107a, 108a and the position of the worm 103 in the axial direction relative to the bearings 107, 108 can be easily set and the assemblability can be improved.

Figure 11:
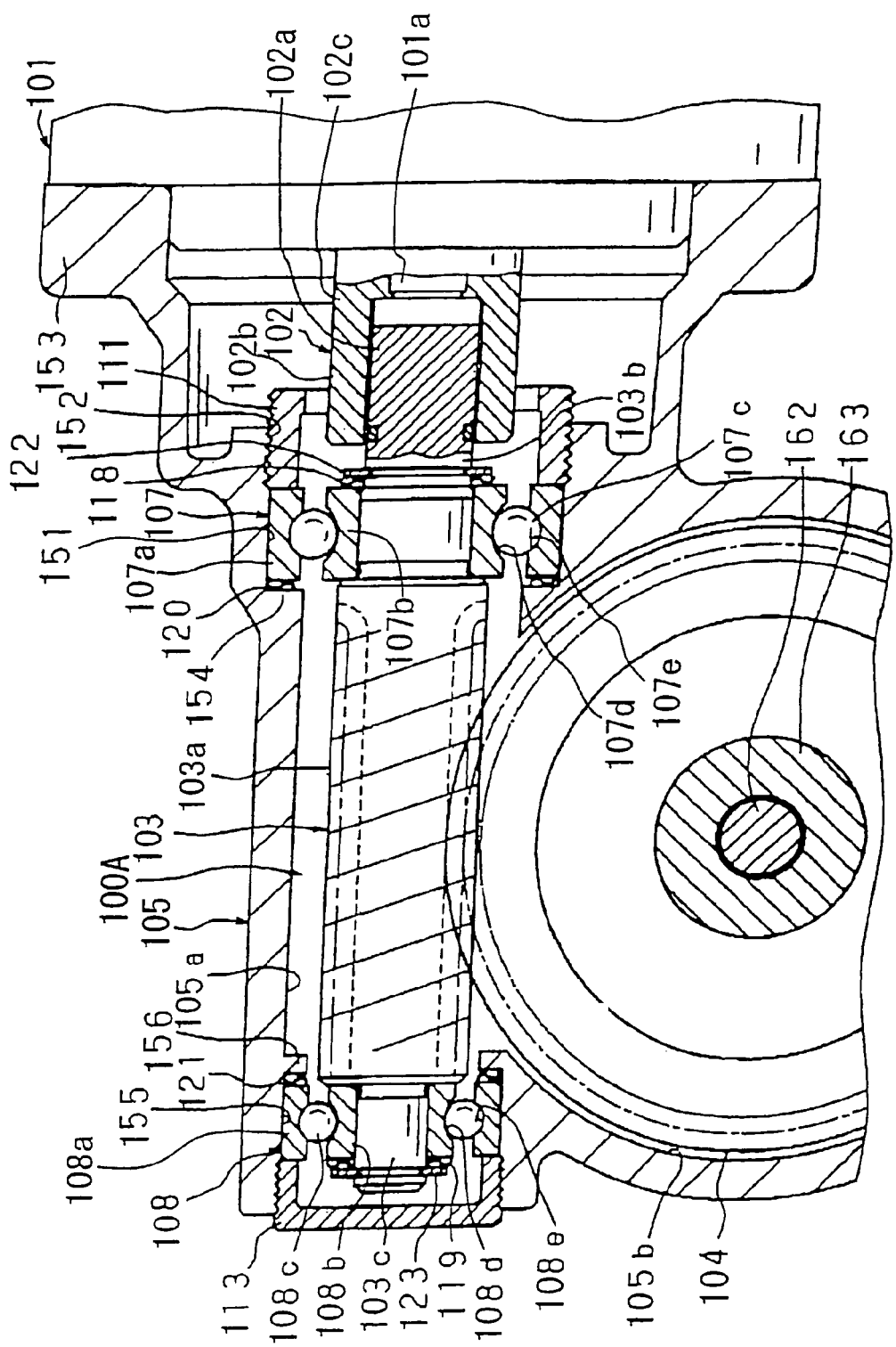
FIG. 11 is an enlarged main cross-sectional view of yet another power assist unit.

Referring to FIG. 11, the power assist unit shown in this figure comprises elastic rings 118, 119, 120, 121 serving as inhibition means for inhibiting the relative movement of the inner rings 107b, 108b in the axial direction relative to outer rings 107a, 108a and allowing the bearings 107, 108 to move in the axial direction with respect to the outer rings 107a, 108a. The worm 103 can move in the axial direction with respect to the inner rings 107b, 108b.

The outer rings 107a, 108a are fit, so that they are free to move in the axial direction, into support holes 151, 155, and elastic rings 120, 121 such as plate springs, elastic washers, or rubber sheets are provided between the outer rings 107a, 108a and control sections 154, 156. Locking rings 122, 123 are provided in the intermediate portions of the shaft sections 103b, 103c, elastic rings 118, 119 such as plate springs, elastic washers, or rubber sheets are provided between the locking rings 122, 123 and inner rings 107b, 108b, and the elastic rings 118, 119 displace the inner rings 107b, 108b toward the tooth section 103a with respect to the outer rings 107a, 108a and prevent the inner rings 107b, 108b from floating in the axial direction with respect to the outer rings 107a, 108a.

When the worm 103 moves axially in one direction (rightward) in the steering region without driving from the motor 101, the tooth section 103a of the worm 103 applies pressure to the inner ring 107b, and the worm 103 moves rightward together with the inner ring 107b, while bending the elastic ring 118, and inhibits the relative movement of the inner ring 107b and outer ring 107a in the axial direction. The movement quantity of the worm 103 decreases as the bending quantity of the elastic ring 118 increases. Furthermore, when the worm 103 moves axially in the other direction (leftward), the tooth section 103a of the worm 103 applies pressure to the inner ring 108b and the worm 103 moves leftward together with the inner ring 108b, while bending the elastic ring 119, and inhibits the relative movement of the inner ring 108b and outer ring 108a in the axial direction. The movement quantity of the worm 103 decreases as the bending quantity of the elastic ring 119 increases. Further, when the worm 103 moves axially in one direction (rightward), the elastic ring 119 is bent via the locking ring 123, the elastic ring 119 is also bent via the inner ring 108b, a rolling body 108c, and the outer ring 108a, the elastic ring 121 bends via the inner ring 108b, rolling body 108c, and outer ring 108, and the entire bearing 108 moves axially in the one direction (rightward). Further, when the worm 103 moves axially in the other direction (leftward), the elastic ring 118 is bent via the locking ring 122, the elastic ring 120 is bent via the inner ring 107b, a rolling body 107c, and the outer ring 107a, and the entire bearing 107 moves axially in the other direction (leftward).

Further, because the relative movement of the inner rings 107b, 108b and outer rings 107a, 108a in the axial direction is inhibited, when the worm 103 and bearings 107,108 are assembled, the position of the inner rings 107b, 108b in the axial direction relative to outer rings 107a, 108a and the position of the worm 103 in the axial direction relative to the bearings 107, 108 can be readily set and the assemblability can be improved.

Figure 12:
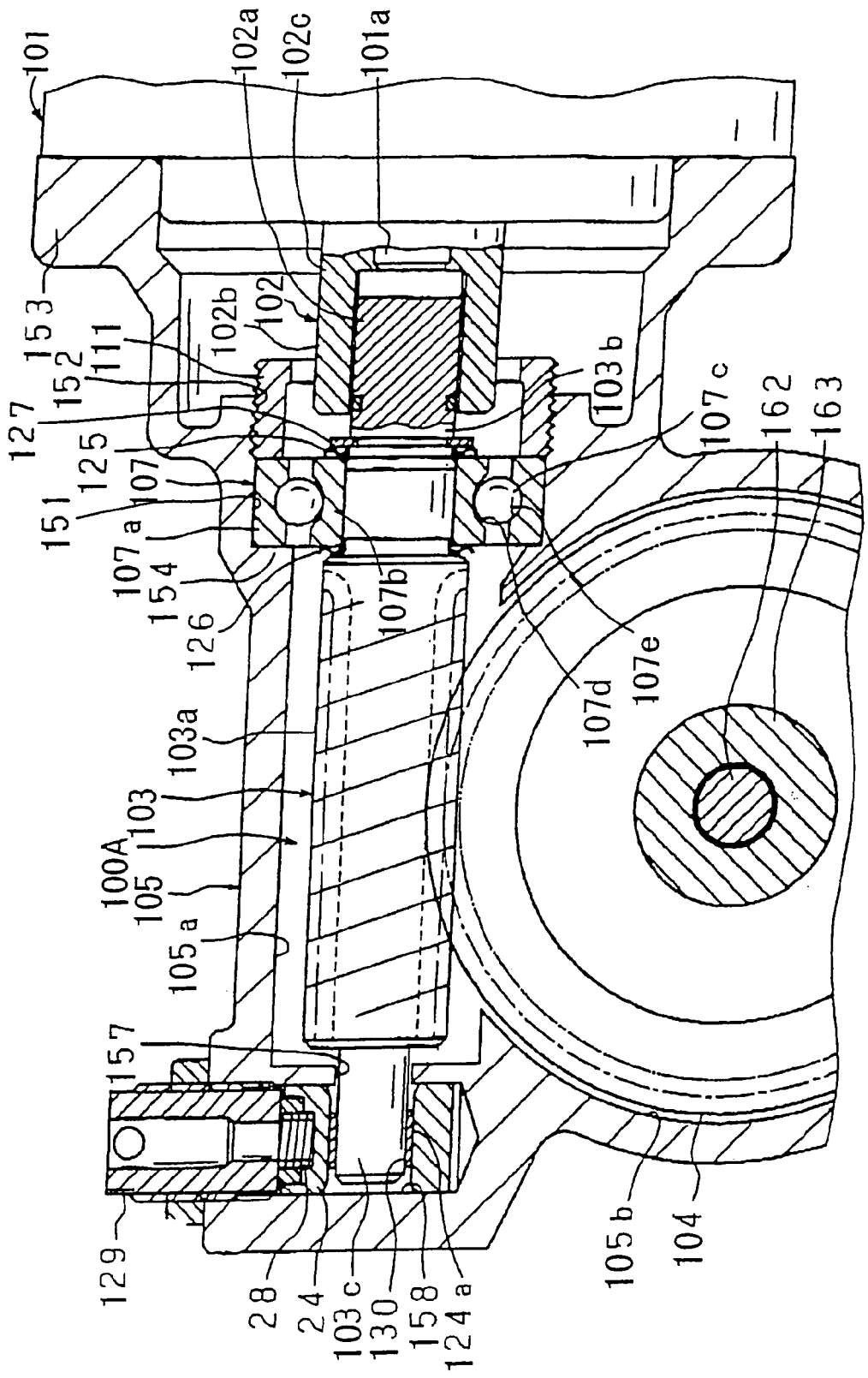
FIG. 12 is an enlarged main cross-sectional view of yet another power assist unit.

Referring to FIG. 12, in the power assist unit shown in this figure, a bearing member 124 for bearing the shaft section 103c is provided to enable the adjustment of the distance between the rotation centers of the worm 103 and worm wheel 104 instead of the bearing 108 located on the opposite side of the motor. Further, elastic rings 125, 126 serving as inhibition means for inhibiting the relative axial movement of the inner ring 107b and outer ring 107a of the bearing 107 of Embodiment 1, which is disposed on the motor side, are provided on both end sides of the inner ring 107b, and the shaft section 103c can move in the axial direction with respect to the bearing member 124.

The worm 103 is specified to be able to move in the axial direction with respect to the bearing member 124. A locking ring 127 is provided in the intermediate portion of the shaft section 103b, elastic rings 125, 126, such as plate springs, elastic washers, or rubber sheets are provided between the locking ring 127 and inner ring 107b and between the tooth section 103a and inner ring 107b, the elastic rings 125, 126 position the inner ring 107b in the center in the axial direction of the outer ring 107a, and the inner ring 107b is prevented from floating in the axial direction with respect to the outer ring 107a.

At the other end portion of the first accommodation section 105a, in view of the receding orifice 157 for inserting the shaft section 103c and the inner surface of the receiving orifice 157, a cylindrical accommodation hole 158 drilled in the radial direction of the shaft section 103c, in other words, drilled in the direction of pushing the worm 103 toward the worm wheel 104 is provided instead of the support hole 155. A bearing member 124 for rotatably joining with the shaft section 103c, an elastic ring 128 composed of a coil spring for applying a force in the direction pushing the bearing member 124, and a hole closing member 129 for closing the opening of the accommodation hole 158 leading to the outside are accommodated in the accommodation hole 158. The hole closing member 129 is threaded into the opening of the accommodation hole 158 leading to the outside.

In the intermediate portion in the axial direction of the bearing member 124, in other words, in the intermediate portion in the direction of movement along the accommodation hole 158, there are provided a bearing hole 124a drilled so as to be perpendicular to the movement direction and a sliding bearing 130 inserted into the bearing hole 124a and fixed therein, and the shaft section 103c is supported, so that it can move in the axial direction, by the bearing member 124 via the sliding bearing 130.

When the worm 103 moves axially in one direction (rightward) in the steering region without driving from the motor 101, the tooth section 103a of the worm 103 applies pressure to the elastic ring 126, and the worm 103 moves rightward together with the inner ring 107b, while bending the elastic ring 126, and inhibits the relative movement of the inner ring 107b and outer ring 107a in the axial direction. The movement quantity of the worm 103 decreases as the bending quantity of the elastic ring 126 increases. Furthermore, when the worm 103 moves axially in the other direction (leftward), the locking ring 127 applies pressure to the inner ring 107b and the worm 103 moves leftward together with the inner ring 107b, while bending the elastic ring 125, and inhibits the relative movement of the inner ring 107b and outer ring 107a in the axial direction. The movement quantity of the worm 103 decreases as the bending quantity of the elastic ring 125 increases.

Further, because the relative movement of the inner ring 107b and outer ring 107a in the axial direction is inhibited, when the worm 103 and bearing 107 are assembled, the position of the inner ring 107b in the axial direction relative to outer ring 107a and the position of the worm 103 in the axial direction relative to the bearing 107 can be easily set and the assemblability can be improved.

Figure 13:
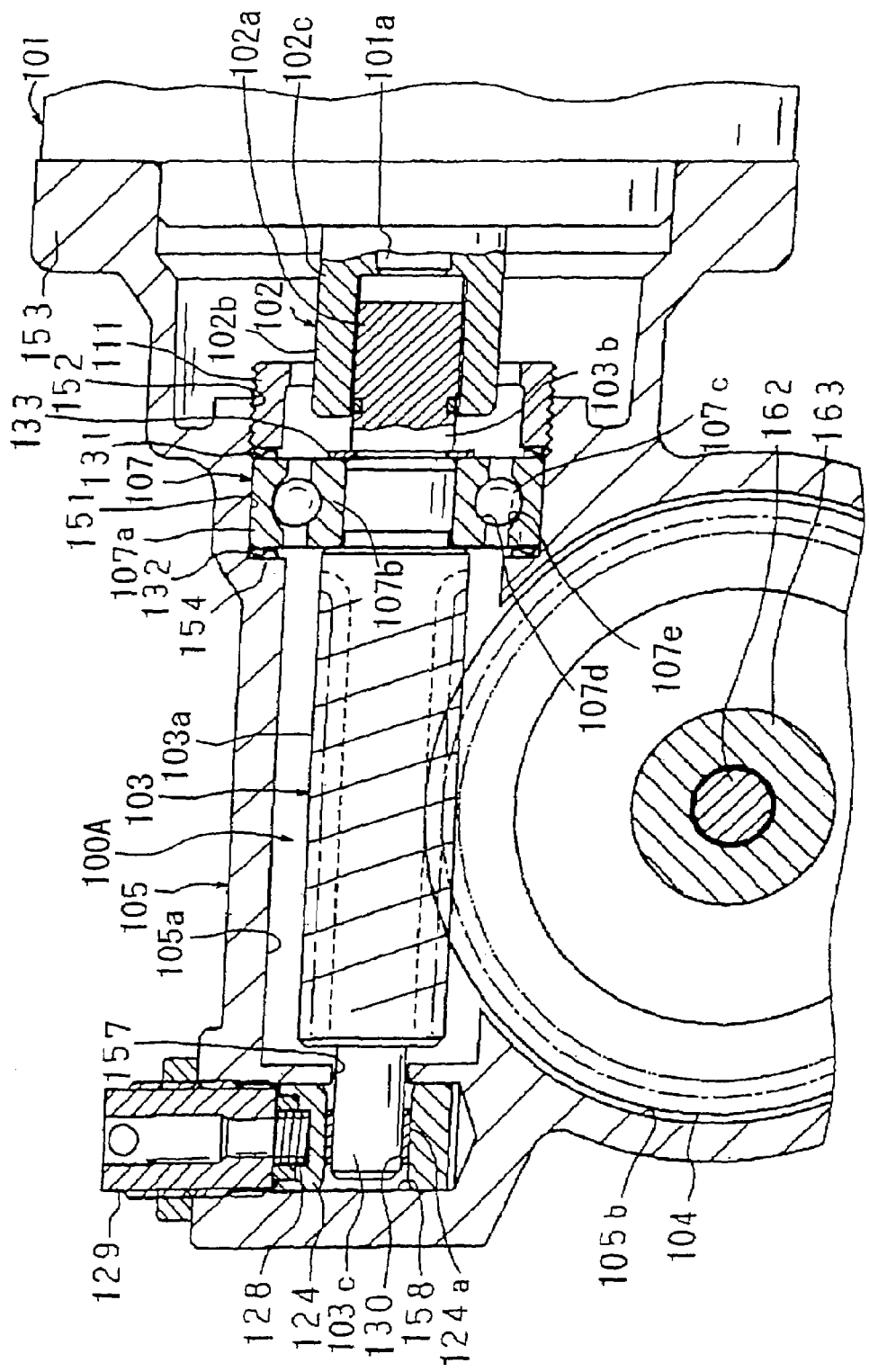
FIG. 13 is an enlarged main cross-sectional view of yet another power assist unit.

Referring to FIG. 13, in the power assist unit shown in this figure, the worm 103 is supported by the bearing 107 on the motor side and by the bearing member 124 on the opposite side from the motor. In such a configuration, elastic rings 131, 132 serving as inhibition means for allowing the outer ring 107a to move in the axial direction, preventing the relative movement of the inner ring 107b and worm 103 in the axial direction, and inhibiting the relative axial movement of the inner ring 107b and outer ring 107a are provided on both ends sides of the outer ring 107a.

The radii of the rolling body 107c and the racetrack groove 107d of the inner ring 107b are the standard values, the racetrack groove 107e of the outer ring 107a is formed similarly to the above-mentioned racetrack groove 107d of the inner ring 107b, the value of the axial inner gap of the bearing 107 is larger than the value specified by the Japanese Industrial Standard, and the worm 103 can be moved in the axial direction with respect to the outer ring 107a and housing 105.

The outer ring 107a is fit so that it can move in the axial direction into the support hole 151. Elastic rings 131, 132 such as plate springs, elastic washers, or rubber sheets are provided between the outer ring 107a and control section 154 and between the outer ring 107a and a threaded ring 111. The elastic rings 131, 132 displace the outer ring 107a toward the center of the inner ring 107b in the axial direction and prevent the outer ring 107a from floating in the axial direction with respect to the inner ring 107b.

A locking ring 133 for controlling the movement of the inner ring 107b in the axial direction is provided in the intermediate portion of the shaft section 103b.

When the worm 103 moves axially in one direction (rightward) in the steering region without driving from the motor 101, the tooth section 103a of the worm 103 applies pressure to the inner ring 107b, the inner ring 107b moves together with the worm 103, applies pressure to the outer ring 107a via the inner ring 107b and a ball 107c, and the worm 103 moves further rightward, while bending the elastic ring 118, and inhibits the relative movement of the inner ring 107b and outer ring 107a in the axial direction. The movement quantity of the worm 103 decreases as the bending quantity of the elastic ring 118 increases. Furthermore, when the worm 103 moves axially in the other direction (leftward), the locking ring 133 applies pressure to the inner ring 107b, the inner ring 107b moves together the worm 103 and applies pressure to the outer ring 107a via the inner ring 107b and rolling body 107c, and the worm 103 moves further leftward, while bending the elastic ring 132, and inhibits the relative movement of the inner ring 107b and outer ring 107a in the axial direction. The movement quantity of the worm 103 decreases as the bending quantity of the elastic ring 132 increases.

Further, because the relative movement of the inner ring 107b and outer ring 107a in the axial direction is inhibited, when the worm 103 and bearing 107 are assembled, the position of the inner ring 107b in the axial direction relative to outer ring 107a and the position of the worm 103 in the axial direction relative to the bearing 107 can be easily set and the assemblability can be improved.

Further, the racetrack grooves 107d, 108d of the inner rings 107b, 108b also may be configured to have a straight, non-archlike surface, rather than a circular arch surface, in the central portion in the width direction of the racetrack grooves 107d, 108d. Furthermore, in the embodiment of FIG. 12, the racetrack grooves 107e, 108e of the outer rings 107a, 108a also may be configured to have a straight, non archlike surface, rather than a circular arch surface, in the central portion in the width direction of the racetrack grooves 107e, 108e.

Further, the value of the axial inner gap of the bearings 107, 108 may be also increased by changing the shape of the racetrack grooves of the inner rings and outer rings, rather than by changing the inner rings 107b, 108b or racetrack grooves 107d, 108d of the inner ring 107b, or as in the embodiment of FIG. 12, by changing the outer rings 107a, 108a or the racetrack grooves 107e, 108d of the outer ring 107a.

The electric power steering apparatus shown in FIGS. 6 to 13 comprises a small gear rotated by a motor and supported by bearings and a large gear engaged with the small gear and connected to driving means and steering assist is provided by the rotation of the motor, wherein the value of the axial inner gap in the ball bearings is larger than the standard value of the Japanese Industrial Standard (also referred to as JIS).

Because the value of the axial inner gap of the bearings supporting the small gear is thus set larger than the standard value, the small gear can be further moved in the axial direction, when compared with the products conforming to the JIS. Moreover, the movement quantity of the small gear in the axial direction can be increased with respect to that in the case where the bearings are used that have the value of the axial inner gap equal to the standard JIS value. Therefore, the steering load in the steering region without the drive from the motor can be reduced and steering feel can be improved. Moreover, because the configuration uses no special additional mechanisms, the structure can be simplified and the small gear components can be miniaturized, despite the fact that the steering load in the steering region without the drive from the motor can be reduced.

Moreover, the above-described electric power steering apparatus comprises inhibition means for inhibiting the relative movement of the inner rings and outer rings of the bearings in the axial direction. When the relative movement of the inner rings and outer rings in the axial direction is thus inhibited, and the small gear and bearings are assembled, the axial position of the inner ring with respect to the outer ring and the axial position of the small gear with respect to the bearing can be easily set and the assemblability can be improved.

Moreover, in the above-described electric power steering apparatus, the inhibition means is an elastic ring. Because the inhibition means can be thus constituted by inserting the elastic ring on the periphery of the small gear, the assemblability can be further improved.

The present invention can be used in devices for providing a steering assist power to a wheel steering mechanism in electric power steering devices of automobiles.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

The invention claimed is:

1. A power assist unit for providing steering assist power to a wheel steering mechanism, the steering mechanism including a steering shaft, said power assist unit comprising:
    a motor including an output shaft, said motor providing rotational motion; and
    a worm gear mechanism for reducing the rotation power and outputting the rotation power as said steering assist power;
    said worm gear mechanism further comprising:
        a housing connecting to said motor;
        a worm disposed within said housing, said worm including first and second shaft ends, said first shaft end connecting to the output shaft of said motor, said worm including a gear section;
        a worm wheel engaged with said worm gear section, said worm wheel being connected to the steering shaft;
        first and second bearings disposed in said housing, said first bearing supporting said first shaft end of said worm and said second bearing supporting said second shaft end of said worm; and
        said first bearing being a deep-groove ball bearing, said bearing including an inner ring, an outer ring, and a bearing ball, said inner ring and said outer ring each including a racetrack groove, wherein:
            said inner ring racetrack groove includes a curvature radius of between 52.5% and 75% of the diameter of said ball; or
            said outer ring racetrack groove includes a curvature radius of between 53.5% and 85% of the diameter of said ball; and
    wherein:
        the raceway groove of the inner ring of said first bearing includes a composite curve surface, said composite curve defining opposing shoulder regions and a bottom region, each region including a curvature radius; and
        said curvature radius of said shoulder regions being smaller than said curvature radius of said bottom region.

2. The power assist unit of claim 1, wherein said housing includes an inner peripheral surface, and wherein:
    said inner ring of said first ball bearing tightly fits against said worm shaft; and
    said second bearing fitting against said second end of said worm shaft so that said bearing moves relative to one of said second end of said worm shaft or said inner peripheral surface of said housing.

3. The power assist unit of claim 2, wherein:
    said inner peripheral surface of said housing includes a large-diameter section surrounding said first shaft end of said worm and a small-diameter section surrounding said second shaft end of said worm, said large and small diameter sections being separated by a step in said inner peripheral surface of said housing;
    said power assist unit further comprising a threaded lid, said threaded lid being threaded into the large-diameter section of said housing; and
    said outer ring of said first bearing being loosely fit against said large-diameter section of said housing, and said outer ring being axially disposed between said step in said inner peripheral surface and said threaded lid.

4. The power assist unit of claim 1, wherein the outer ring of said second bearing being press fit into said small-diameter section, said outer ring being axially disposed therein and the inner ring of the second bearing is joined by loose fitting into the shaft portion of said worm.

* * * * *